United States Patent
Kim et al.

(10) Patent No.: US 9,356,844 B2
(45) Date of Patent: May 31, 2016

(54) EFFICIENT APPLICATION RECOGNITION IN NETWORK TRAFFIC

(75) Inventors: Seong-Hwan Kim, Allentown, PA (US); Sundar Vedantham, Allentown, PA (US); Pavan Kumar Venkata Maddipatla, Maharashtra (IN)

(73) Assignee: Intel Corporation, Santa Clara, CA (US)

( * ) Notice: Subject to any disclaimer, the term of this patent is extended or adjusted under 35 U.S.C. 154(b) by 1000 days.

(21) Appl. No.: 13/463,169

(22) Filed: May 3, 2012

(65) Prior Publication Data

US 2013/0294449 A1    Nov. 7, 2013

(51) Int. Cl.
| | | |
|---|---|---|
| *H04L 12/28* | (2006.01) | |
| *H04L 12/56* | (2006.01) | |
| *H04L 12/26* | (2006.01) | |
| *H04L 29/06* | (2006.01) | |
| *H04L 12/851* | (2013.01) | |

(52) U.S. Cl.
CPC .............. *H04L 43/026* (2013.01); *H04L 69/12* (2013.01); *H04L 69/22* (2013.01); *H04L 47/2441* (2013.01)

(58) Field of Classification Search
CPC .............. H04L 29/0602; H04L 45/306; H04L 47/2475
See application file for complete search history.

(56) References Cited

U.S. PATENT DOCUMENTS

| | | | |
|---|---|---|---|
| 6,651,099 B1 | 11/2003 | Dietz et al. | |
| 6,651,101 B1 | 11/2003 | Gai et al. | |
| 6,865,672 B1 | 3/2005 | Carmeli | |
| 6,961,770 B1 | 11/2005 | Ott | |
| 2006/0136722 A1 | 6/2006 | Ogura et al. | |
| 2006/0268866 A1 | 11/2006 | Lok | |
| 2008/0189784 A1 | 8/2008 | Mangione-Smith et al. | |
| 2010/0095367 A1* | 4/2010 | Narayanaswamy | 726/12 |
| 2010/0150104 A1 | 6/2010 | Yoon et al. | |
| 2010/0191958 A1* | 7/2010 | Chen | 713/153 |
| 2010/0232370 A1 | 9/2010 | Jing et al. | |
| 2010/0232447 A1* | 9/2010 | Jing et al. | 370/412 |
| 2010/0309794 A1 | 12/2010 | Keynan et al. | |
| 2011/0080886 A1 | 4/2011 | Chandrachood et al. | |
| 2011/0196971 A1* | 8/2011 | Reguraman et al. | 709/228 |

* cited by examiner

*Primary Examiner* — Lonnie Sweet
(74) *Attorney, Agent, or Firm* — Barnes & Thornburg LLP

(57) ABSTRACT

A system and method is provided for providing an initial determination of the type of application recognition processing that is required for incoming traffic, and directing the packets accordingly. The invention is based on optimized resource allocation that uses multiple, application-dependent data paths. An exemplary set of application-dependent data paths includes, for example, Fixed Attribute Table (FAT), Deep Packet Inspection (DPI) and CPU Processing data paths. By using optimized and application-dependent network traffic processing paths, it is possible to achieve a less resource-hungry hardware design than previously contemplated in the prior art, where all traffic proceeded along a single path and was subjected to DPI processing.

14 Claims, 6 Drawing Sheets

EFFICIENT APPLICATION RECOGNITION IN NETWORK TRAFFIC

BACKGROUND OF THE INVENTION

Description of the Related Art

Modern communication networks are typically packet-switched networks that transmit information between a source and a destination in streams of packets. A packet typically has a "data payload" section and a "housekeeping" section. The data payload section comprises a portion of the information being transmitted between the source and destination in a given communication session, while the "housekeeping" section generally comprises management and control data used to achieve a successful communication session and typically takes the form of a "header" and a "tail" for the packet. The header usually includes an address for the packet destination (destination internet protocol (IP) address), an address of the source (source IP address), as well as information about the data payload the packet carries. The tail of a packet, as it name implies, marks the end of the packet, including an error protection mechanism. Proper routing of a packet from a source to a destination generally requires one or more nodes to perform what is referred to as "shallow inspection" of a packet's header information.

In many networks, "deep packet inspection" (DPI) is now utilized for a variety of reasons, ranging from providing network security to control of the overall network. Communication networks have limited bandwidth, i.e., a limited capacity for transmitting data while providing a satisfactory Quality of Service (QoS). A DPI processor may be used to inspect the payload of an incoming packet, as well as its header, in order to determine the information carried in each "layer", as in the standard OSI 7-layer model, which identifies a packet by its source and destination addresses and ports, its protocol, and an application that it implements. A packet's source and destination addresses, as well as its ports and protocol are conventionally carried in layer 2 to layer 4. The addition of information regarding an application that a packet implements is considered to be a "higher level" identification carried in layer 4 to layer 7 in the OSI model. The DPI processor is used to identify applications, and the resulting information can be used to allocate available network bandwidth where it is most needed and/or where subscribers are willing to pay a premium for expedited service.

DPI is a particularly difficult challenge for packet processors because of the need for real-time or near-real-time packet forwarding. Almost all of the network activities that users normally engage in require that packets be forwarded expediently with minimal delay, or at least predictably uniform delay.

Although a residential user may be willing to accept a high latency network as a simple fact of life, the typical corporate user wilt find such a delay unacceptable. In particular, real-time communications applications (e.g., instant messaging, gaming) become difficult if not impossible to use effectively in high-latency and/or variable latency environments. Multimedia network activities (e.g., VoIP, VoD) have even tighter tolerances, sometimes as low as 250 ms end-to-end latency for proper operation. As a result, it becomes important to recognize the traffic type and application streams so that the network will be well managed. As used in this context, "welt managed" can relate to blocking offensive applications or prioritizing latency-sensitive traffic (such as voice calls) over latency-insensitive traffic (such as emails). Recognition of traffic type and application recognition is also utilized for "traffic and application profiling" and creating statistics regarding the type of data passing through a particular network node.

Traditional traffic and application profiling models use general-purpose Central Processing Units (CPUs) to analyze the incoming traffic in its entirety. While using CPUs allows for profiting to be accomplished using a conventionally-written C program, the resources involved in this process become overwhelming, perhaps precluding one or more CPUs from having the capability to address other, more pertinent, processes or programs. Traffic and application profiting may be useful for a variety of reasons including, for example, monitoring the volume of traffic on a network so as to be able to appropriately plan for future expansion. Wireless communication service providers may utilize this profiling to apply different QoS and billing, based on the application(s) being used by a customer. Specifically, in this wireless communication environment, the profiling result can be expanded to support user profiling. A corporate customer may use application profiling to limit offensive and/or malicious applications from penetrating into a corporate network—and may also use this profiling to limit the use of the corporate network by employees for applications such as downloading multimedia files, such as movies or the like, which tend to overwhelm the bandwidth capabilities of a corporate network. Additionally, law enforcement organizations may utilize communication traffic profiles to identify suspicious and/or objectionable activities.

Most of the existing network processing platforms use a dedicated data path for performing traffic profiling through application recognition. Fundamentally, only one data packet processing path is used for analyzing all of the incoming traffic. This topology requires the use of a very high speed—and "resource-hungry"—DPI processor, since all of the incoming traffic needs to go through the same DPI processor, even though most of the traffic does not require DPI scanning (or at least the full level of DPI scanning) Indeed, in one industry estimate, less than 10% of all applications from the entire traffic flow requires DPI; yet, the current configuration for traffic profiling sends all traffic through the DPI processor. As a result, the application recognition sub-process becomes a high cost impediment in improving the efficiency and expense of the overall network processor.

SUMMARY OF THE INVENTION

This Summary is provided to introduce a selection of concepts in a simplified form that are further description below in the Detailed Description. This Summary is not intended to identify key features or essential features of the claimed subject matter, nor is it intended to be used to limit the scope of the claimed subject matter.

In one embodiment, the present invention describes a system for providing application recognition with respect to incoming packet-based data traffic comprising a plurality of separate data paths for performing application recognition, each path utilizing a different process to perform application recognition and a modular packet processor module for analyzing a portion of incoming packets and routing that portion to a selected one of the plurality of separate data paths for performing application recognition based upon the analyzed portion.

In another embodiment, present invention describes a method of performing application recognition on incoming data traffic comprising the steps of: (1) submitting incoming data traffic to a modular packet processor; (2) retrieving a portion of the connection information from a packet(s) of the incoming data traffic; and (3) determining, based on the retrieved information, a proper data path from a plurality of data paths to perform application recognition, each data path utilizing a different process to perform application recognition.

BRIEF DESCRIPTION OF THE DRAWINGS

Other aspects, features and advantages of the present invention will become more fully apparent from the following detailed description, the appended claims, and the accompanying drawings in which like reference numerals identify similar or identical elements.

DETAILED DESCRIPTION

Figure 1:
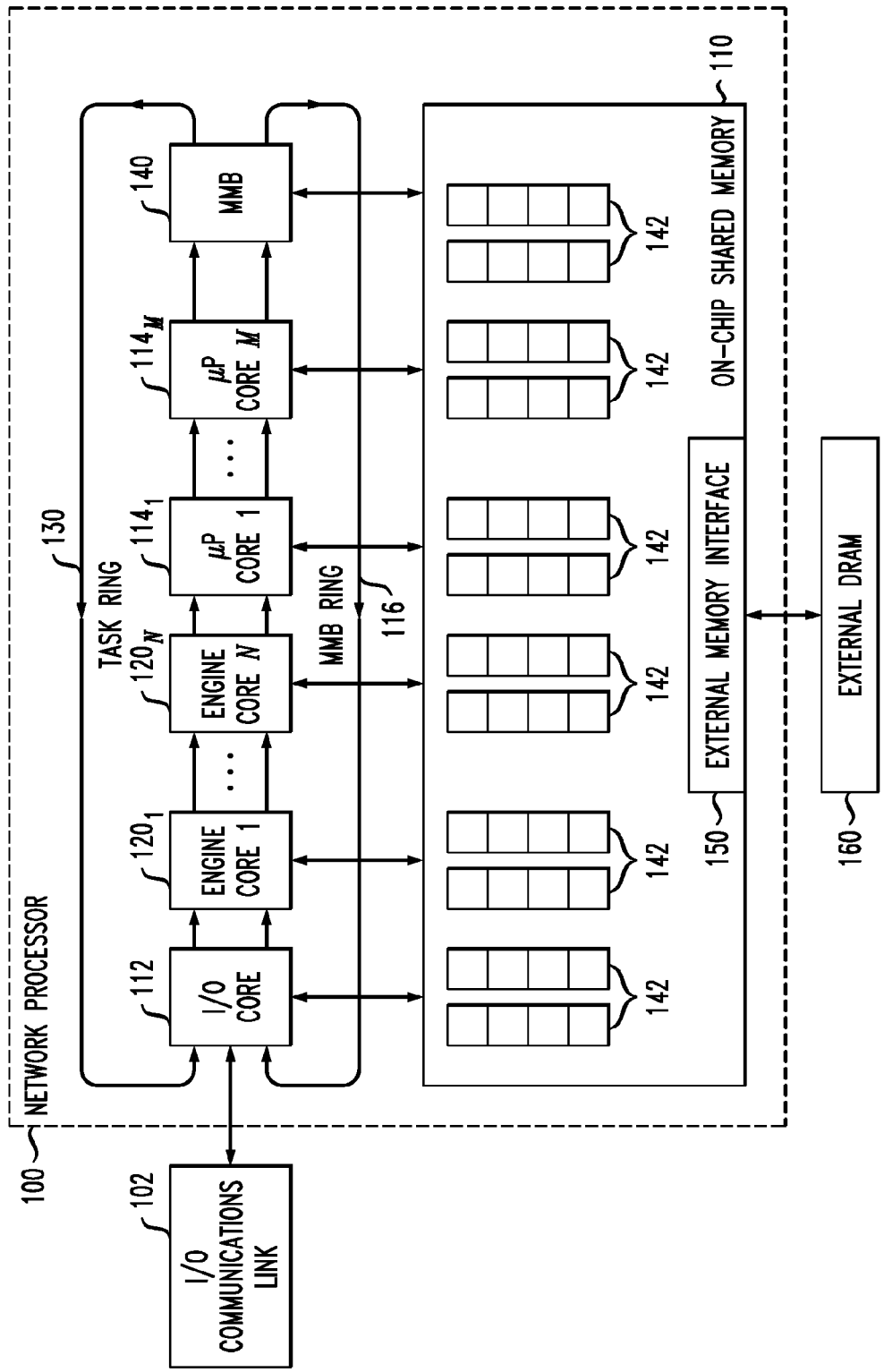
FIG. 1 is a block diagram of a network processor in accordance with described embodiments.

In accordance with embodiments of the present invention, a system and method is provided for performing a determination of the type of application recognition processing that is required for incoming traffic, and directing the packets accordingly. The invention is based on optimized resource allocation that uses multiple, application-dependent data paths that are used to perform recognition. An exemplary set of application-dependent data paths provide application based upon, for example, Fixed Attribute Table (FAT) lookup, Deep Packet Inspection (DPI) processing and Central Processing Unit (CPU) processing. By using optimized and application-dependent processing paths, it is possible to achieve a less resource-hungry hardware design for providing application recognition than previously contemplated in the prior art, where all traffic proceeded along a single path for application recognition and was subjected to DPI processing whether or not it was required for any specific packet in the traffic stream. Incoming packets are classified based on a capability built into a communication processor at the input of the receiving network (one exemplary communication processor being the Axxia Communication Processor (ACP) offered by LSI, Inc. of Milipatas, Calif.). The communication processor is configured to include and utilize a modular packet processor (MPP) that intercepts the incoming traffic and determines, on a packet-by-packet basis, which of the data paths is best suited to "recognize" the proper application type associated with each packet as it enters the network. By making this initial determination, only that subset of traffic which requires DPI for application recognition is sent through a DPI processor. The remaining incoming traffic is thus handled in an efficient and timely manner without unnecessarily including the DPI processor in the application recognition process path, thus maximizing application recognition efficiency by optimizing the use of the DPI processor.

It is presumed that most packets entering a network access point are associated with well-known applications that maintain a constant (static) destination port assignment and associated protocol information. The FAT can then be used to find the proper application (i.e., perform the "recognition") by using the port number and protocol identification (ID) presented in the packet as the lookup query to the table. A separate type of packet traffic—not as typical—may be defined as "stateful", where dynamic ports are assigned on a session-by-session basis. Stateful processing relies on both FAT and a CPU to keep track of the requests and responses by maintaining data about the history of the packets, and can correlate different bi-directional flows of multi-channel applications into a single, related conversation. Additionally, stateful processing may take the form of "persistent sessions" where all packets from a specific user (source IP address) are routed to the same server (destination IP address). For this type of traffic, the information stored in the CPU must be transferred to the MPP to provide proper application recognition. Lastly, as noted above, there exists a small number of applications that can only be recognized by performing DPI and analyzing the payload within the packet, looking for particular signatures and/or patterns to ascertain the identification of the associated application.

It is an aspect of the invention that virtual pipelines are used as the separate data paths to efficiently handle identification of traffic types. The virtual pipeline architecture allows one to have multiple optimized traffic paths for recognizing different applications in the traffic without having to dedicate specific hardware resources as required for an actual pipeline configuration. A complete description of the virtual pipeline architecture can be found in co-pending application Ser. No. 12/782,411 filed May 18, 2010 and assigned to the assignee of this application and herein incorporated by reference.

Table 1 defines a list of acronyms employed throughout this specification as an aid to understanding the described embodiments of the present invention:

TABLE 1

| | |
|---|---|
| CP | Control Plane |
| DP | Data Plane |
| DPI | Deep Packet Inspection |
| PF | Predicted Flow |
| LAN | Local Area Network |
| EIOA | Ethernet Input/Output Adapter |
| MPP | Modular Packet Processor |
| WAN | Wide Area Network |

FIG. 1 shows a block diagram of a single-chip network processor implemented as a system-on-chip (SoC), shown as network processor 100. Network processor 100 might be used for processing data packets, performing protocol conversion, or the like. Network processor 100 includes on-chip shared memory 110, one or more input-output (I/O) cores, shown as I/O core 112, one or more microprocessor (μP) cores, shown as μP cores 114$_1$-114$_M$, and one or more engine cores 120$_1$-120$_N$, where M and N are integers greater than 1. Network processor 100 also includes task ring 130, memory manager block (MMB) 140, MMB ring 116, and external memory interface 150 for communication with external memory 160. External memory 160 might typically be implemented as a dynamic random-access memory (DRAM), such as a double-data-rate three (DDR-3) DRAM, for off-chip storage of data. In some embodiments, such as shown in FIG. 1, all of the one or more I/O, µP and engine cores, and MMB 140, are directly coupled to shared memory 110. In alternative embodiments, each of the one or more I/O, RP and engine cores, and MMB 140 might not need to be directly coupled to shared memory 110.

Shared memory 110 might include one or more FIFO queues 142. One or more of FIFO queues 142 might be dynamically allocated in shared memory 110 to the various cores 112, 114, and 120 based on corresponding requests by the cores to MMB 140. Each core might request allocation of memory for additional FIFO queues via MMB ring 116. While, in FIG. 1, task ring 130 and MMB ring 116 are shown coupled to the various cores in an order, one skilled in the art will realize that such order is for illustrative purposes only, and any one of the cores might be adjacent to another core along rings 130 and 116. As described herein, the term "adjacent" describes either a previous core or subsequent core on communication rings 116 and 130. For example, in the embodiment shown in FIG. 1, MMB 140 is adjacent to µP core $114_M$ and I/O core 112.

I/O core 112 might typically be implemented as hardware that connects network processor 100 to one or more external devices through I/O communication link 102. I/O communication link 102 might generally be employed for communication with one or more external devices, such as a computer system or networking device, that interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in memory 110 and then one or more "tasks" corresponding to the received packets are provided, via task communication ring 130, to one or more of the various cores. As described herein, a task is a command issued between cores to perform processing functions on at least a portion of packet data. Transmitted packets are preferably received from a task and transmitted externally.

Task ring 130 is a communication bus linking adjacent cores together in a serial or "daisy-chain" fashion. In one embodiment, task ring 130 might be a unidirectional ring that passes task control information from a source core to a destination core, and the tasks might contain address pointers to data stored in shared memory 110. As described herein, tasks are instructions to the destination core to perform certain functions. Tasks received by a destination core might be stored in a corresponding one of FIFO queues 142, and the data corresponding to the task to be processed by the destination core might be stored in shared memory 110.

Tasks allow network processor 100 to process a wide variety of data and control messages more efficiently than with a fixed pipeline or non-pipelined architecture. As discussed in more detail below, the sequence of the tasks depends on i) the type of packet and ii) the type of processing performed by the various cores on a particular packet (or group of packets), control message, or other data. This is referred to herein as a "Virtual Pipeline™", a trademark of LSI Corporation, of Milpitas, Calif.

In described embodiments, a virtual pipeline operates by each core receiving a task, executing that task, and assigning a subsequent task to another (or the same) core depending on the packet or instruction being processed. For purposes here, a core generating a task is referred to as a source core, and a core given a task to execute is referred to as a destination core. Tasks provided to a destination core are written to shared memory 110 by the source core and read from shared memory 110 by the destination core. Task ring 130 provides a communication path for the various cores to pass tasks to each other utilizing messages that contain the address pointers to data corresponding to the task stored in shared memory 110. Although shown in FIG. 1 as a ring bus, it is understood that other topologies other than a ring might be used to pass tasks from core to core, such as direct connections between each of the cores or use of a switch system. As described below, a task data structure might typically include i) an identification of a virtual pipeline for the task, ii) packet specific parameters and engine instructions for the virtual pipeline, iii) inline header and trailer data for the task, and iv) pointers to data stored in memory 110.

The µP cores and engine cores (accelerators) illustrated in FIG. 1 might be categorized into three categories: i) multi-threaded special purpose processors, ii) software-driven hardware accelerators, and iii) command-driven hardware accelerators. A multi-threaded special purpose processor is preferably designed for processing that is dominated by random sequences of memory accesses. Deep packet inspection and packet classification engines are the best example of processes requiring random memory accesses. For example, a Modular Packet Processor (MPP) is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread state in memory instead of in register files.

As mentioned above, operations of the cores in network processor 100 are controlled using tasks. A task might contain a data packet, but might also contain only commands and metadata. A task is a request from a source entity or source core to a destination entity or destination core for the destination core to perform some processing task. Tasks are communicated via memory-based FIFO queues 142 in shared memory 110. Each task has an assigned priority level. A task is a data structure that preferably contains one or more of the following items: (1) Identification of which virtual pipeline this task is on (2) Packet specific parameters and engine instructions for the virtual pipeline; (3) Inline data (header and trailer); and (4) Pointers to data stored in memory 110. A source entity sends a task to a destination entity by sending a task message on task request ring 130. The task message is passed from adjacent entity to adjacent entity on task request ring 130 until the destination entity is reached. The destination entity sends a response to the source entity on task request ring 130, again passed adjacent entity to adjacent entity until the source entity is reached, that indicates an address to write the task, and the source entity writes the data to the address specified by the destination entity.

Figure 2:
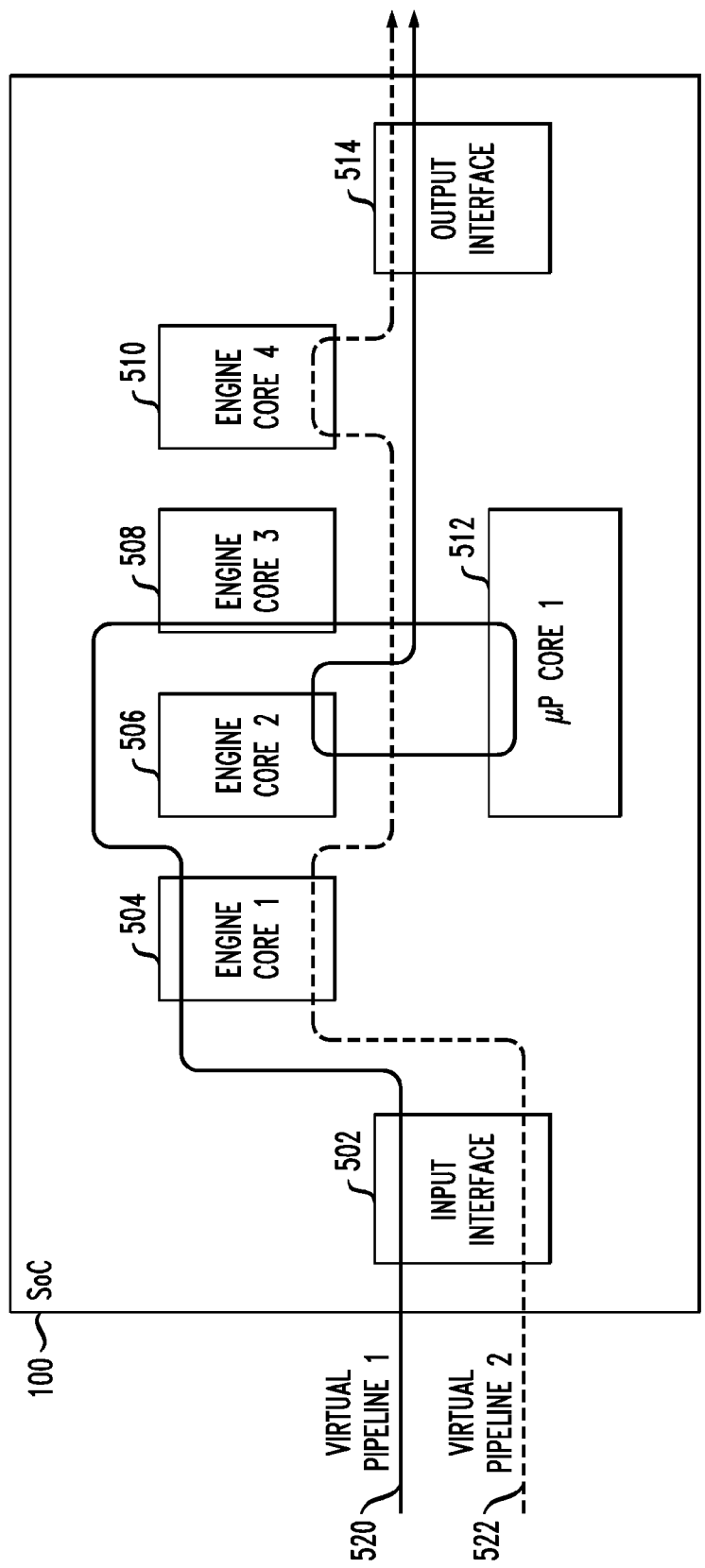
FIG. 2 shows a data flow of two example virtual pipelines through the network processor of FIG. 1.
Figure 5:
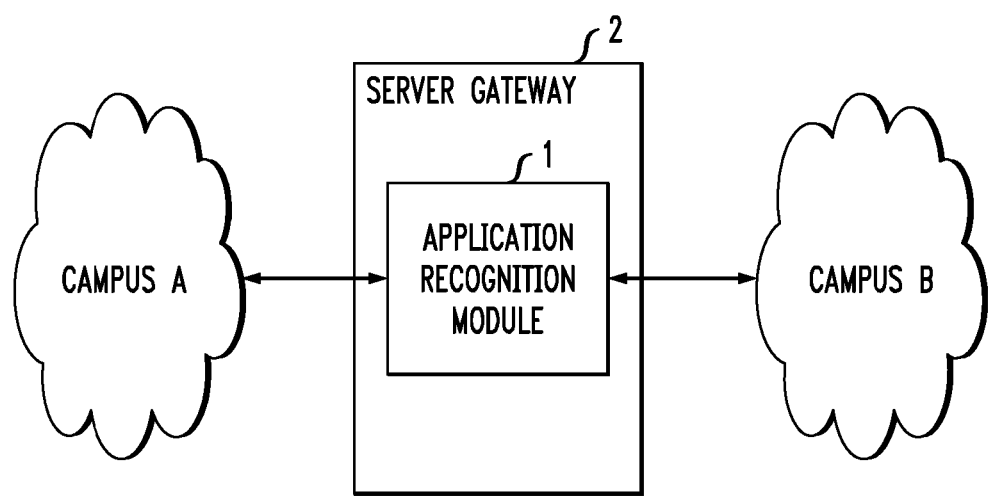
FIG. 5 is a block diagram of an alternative application of the application recognition process of the present invention, in this case as an inter-campus interface between two unsecured locations.

FIG. 2 shows a flow of two exemplary virtual pipelines through network processor 100. FIG. 5 shows a first virtual pipeline sequence 520 for processing an exemplary packet, and a second virtual pipeline 522 for processing another exemplary packet. As shown in FIG. 2, virtual pipeline 520 defines a processing order starting at input interface 502 (such as the I/O core 112 of FIG. 1), engine core 504, engine core 508, processor core 512, engine core 506, and finally output interface 514. However, another packet received by the input interface 502 might be processed in accordance with second virtual pipeline 522. As shown in FIG. 2, virtual pipeline 522 also defines a processing order starting at input interface 502 and engine core 504 but then proceeds to engine core 510 and then output interface 514. Processor core 512 and engine cores 506 and 508 are not included in virtual pipeline 522. Because only those cores that are required are included in a virtual pipeline, network processor 100 has increased efficiency of processing data packets. Each engine core includes template tables describing the task parameters and task format for processing by the next engine for each task on a given virtual pipeline, and which task parameters are consumed by the current engine. In an exemplary embodiment of the present invention, engine core 504 might be a packet classifier that parses incoming packet and determines what tasks (virtual pipeline) are to follow for a given packet. Engine core 506 might be a scheduler that transmits outgoing task according to configured schedule parameters. Engine core 508 might be a decryption engine that decrypts packet prior to sending it to processor core 512. Engine core 510 might be a data packet modifier that updates packet data before sending it out via output interface 514.

Figure 3:
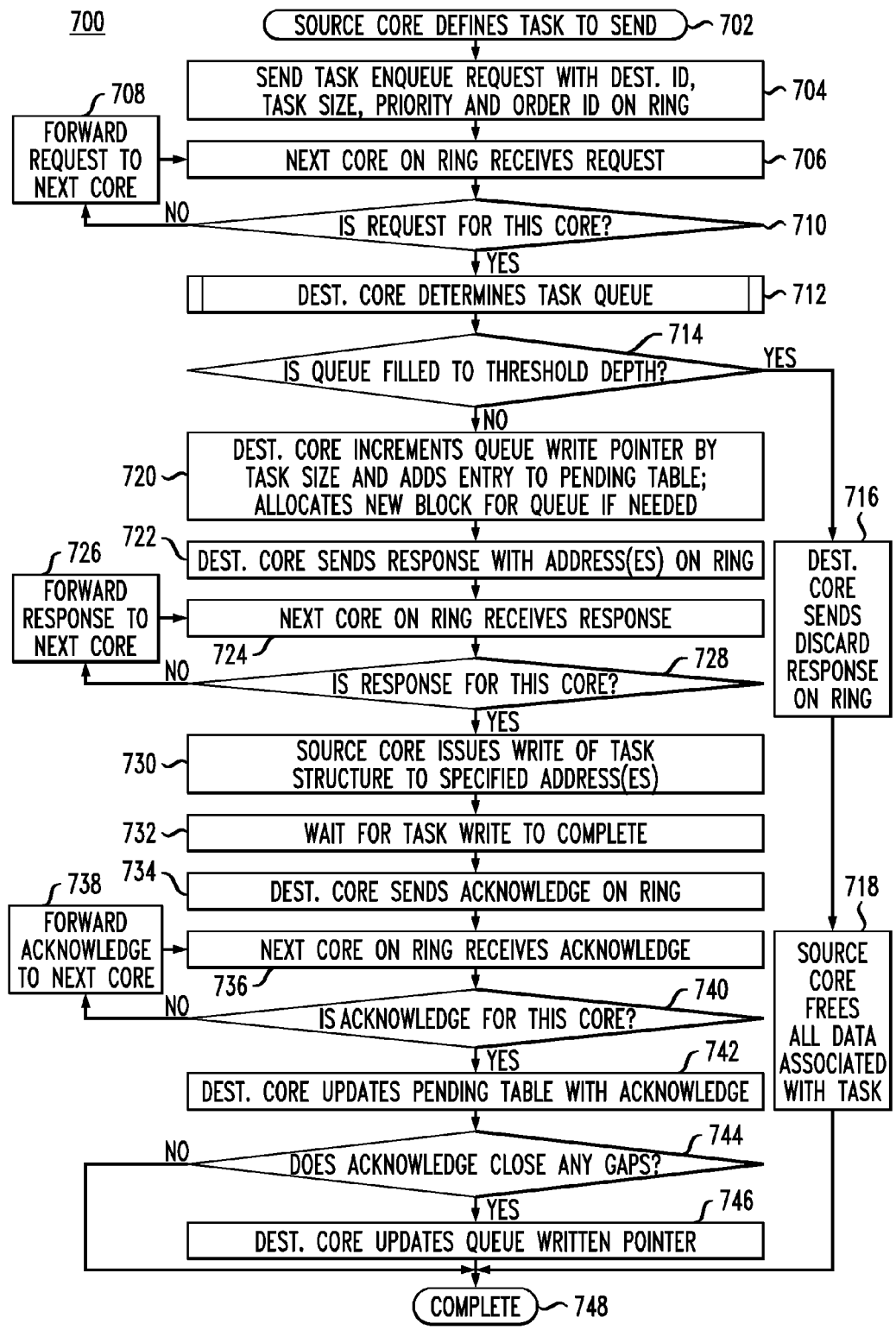
FIG. 3 is a flow diagram of an example process for sending tasks between one or more cores of the network processor of FIG. 1.

FIG. 3 shows a flow diagram of an exemplary process 700 for sending tasks between one or more cores of the network communications processor by appending to one of its input task queues a message via task ring 130. Messages are used to manage the memory locations in shared memory 110 to write the tasks. At step 702, a source core defines a task to be performed by a destination core and, at step 704, the source core sends a task request around the ring with the ID of the destination source and the size of the relevant task. The task request might also include additional data, such as a priority indication and order ID. The task request moves from core to core along task ring 130 until the destination core receives the request, as illustrated in steps 706-710. At step 712, the destination core determines which of its task queues is to store the task, as will be discussed in more detail below. If, however, at step 714 the destination queue is determined to be filled beyond a threshold depth if the task is accepted, at steps 716 and 718 the designation core effectively instructs the source core to discard the task and the associated task data. Steps 716 and 718 might typically include similar communication ring steps such as illustrated in steps 706-710. If the queue will not be filled beyond the threshold depth, then at step 720 the source core increments a queue write pointer by the task size, adds an entry to a table of pending tasks and allocates new blocks of memory for the task queue, if needed.

At step 722, the destination core responds to the source core with the memory address at which to write the new task, and the response propagates along the task ring until reaching the source core in steps 724-728. At steps 730 and 732, the source core then writes the task at the specified address and responds to the destination core with an acknowledgement on the task ring at step 734. The acknowledgment indicates to the destination core that the task data is now ready. The acknowledgement propagates around the task ring until the source core receives the acknowledgement at steps 736-740, and at step 742, the destination core updates a table of pending tasks with the acknowledgement. Because there might be several tasks being written in a given queue at any time, the queues are able tolerate gaps in the queue if a later arriving task complete a write to cache before the earlier task finishes writing the queue. To handle this, at step 744, the destination core manages the fact that there could be several of these task writings in process at a time by checking to see if any of the gaps are closed when the acknowledgement is sent. Then, at step 746, the destination core updates a pointer (a "written" pointer that, when it does not equal a write pointer, indicates that a gap exists in the queue). The destination core then simply reads the next task from a simple FIFO queue. At step 748 the task transfer is complete.

Figure 4:
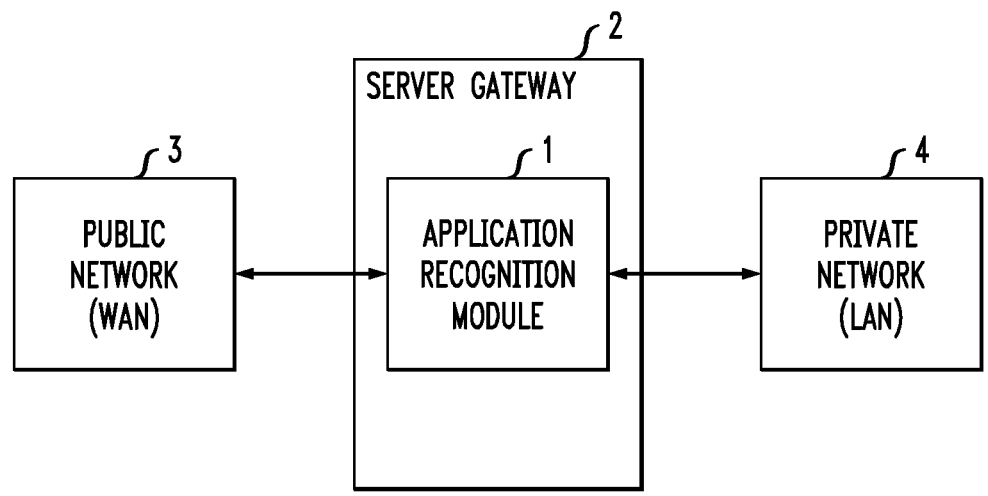
FIG. 4 is a generalized block diagram illustrating an inter-network utilization of application recognition in accordance with exemplary embodiments of the present invention.

FIG. 4 illustrates, at a high level, the inclusion of an application recognition module 1 within a server gateway 2 between, for example, a public network/WAN 3 and a private network/LAN 4. As the WAN traffic enters gateway 2 on its way to LAN 4, or leaves LAN 4 for a destination in WAN 3, the data traffic is examined by application recognition module 1 to develop profiles of the traffic streams. FIG. 5 illustrates another application, in this case utilizing an application recognition module 1 between two campus locations (shown as Campus A and Campus B in FIG. 2). The profiles may be used for network traffic monitoring and/or application usage monitoring, including security and control aspects of monitoring.

As also mentioned above, the traditional traffic profiling models of application recognition module 1 use general purpose CPUs to analyze the incoming data traffic in its entirety. While this model makes it easy to design a DPI application (usually written as a simple C-language program), this straightforward approach involves significant CPU resources by requiring all packets to pass through the DPI processor. Indeed, the CPU may become overwhelmed and unable to take up other tasks (which may be more important than analyzing the incoming traffic) if the DPI process is implemented on CPUs. That is, even if a DPI processor is a hardware-based implementation, the traditional inspection method necessarily consumes all of the DPI processor resource to analyze the entire data traffic stream.

Thus, it is proposed in accordance with the present invention to insert application recognition "intelligence" at the gateway between networks, so that only the subset of traffic requiring DPI analysis is directed into a DPI processor. In most networks, a majority of the incoming traffic does not require DPI for application recognition and can be sent through a different data path(s) (i.e., virtual pipeline) that will efficiently perform application recognition using fixed attribute table (FAT) processing and/or CPU processing (in the case of analyzing a "stateful" packet). Inasmuch as the application recognition process utilizes the hardware engine-based virtual pipelines, it does not slow down packet transmission and can maintain speeds at, for example, a gigabit or faster transmission rate.

"Stateful" packet traffic, as discussed hereinbelow, is considered to refer to that data traffic which retains certain "state" information as it travels through the communication network. In general, the term "state" refers to the current or last-known status or condition of a process, transaction or setting. A stateful process takes into account many conditions of the data, including historical packet activity. For example, some forms of network security applications require stateful processing, requiring the monitoring of conversations in the packet stream (including requests and responses to requests). In stateful processing, the port number assignment is dynamic and not able to be used to identify a specific application without monitoring the previous conversation.

The application recognition method and system of the present invention inspects and classifies incoming packets using attributes such as "stateful" processes, applications requiring DPI, and the like, built into an associated communication processor. In particular and as will be discussed in detail below in associated with the implementation shown in FIG. 6, the method and system uses a classification hardware accelerator processor to detect the applications at gigabit speeds. Various techniques are used for recognition of applications based on their complexity and may be based on the following: (1) Fixed Attribute-based recognition; (2) DPI-based recognition; and (3) State-based recognition. In general and in one embodiment, an analysis of an incoming packet's header information is used to provide this initial determination of the proper path for application recognition.

Figure 6:
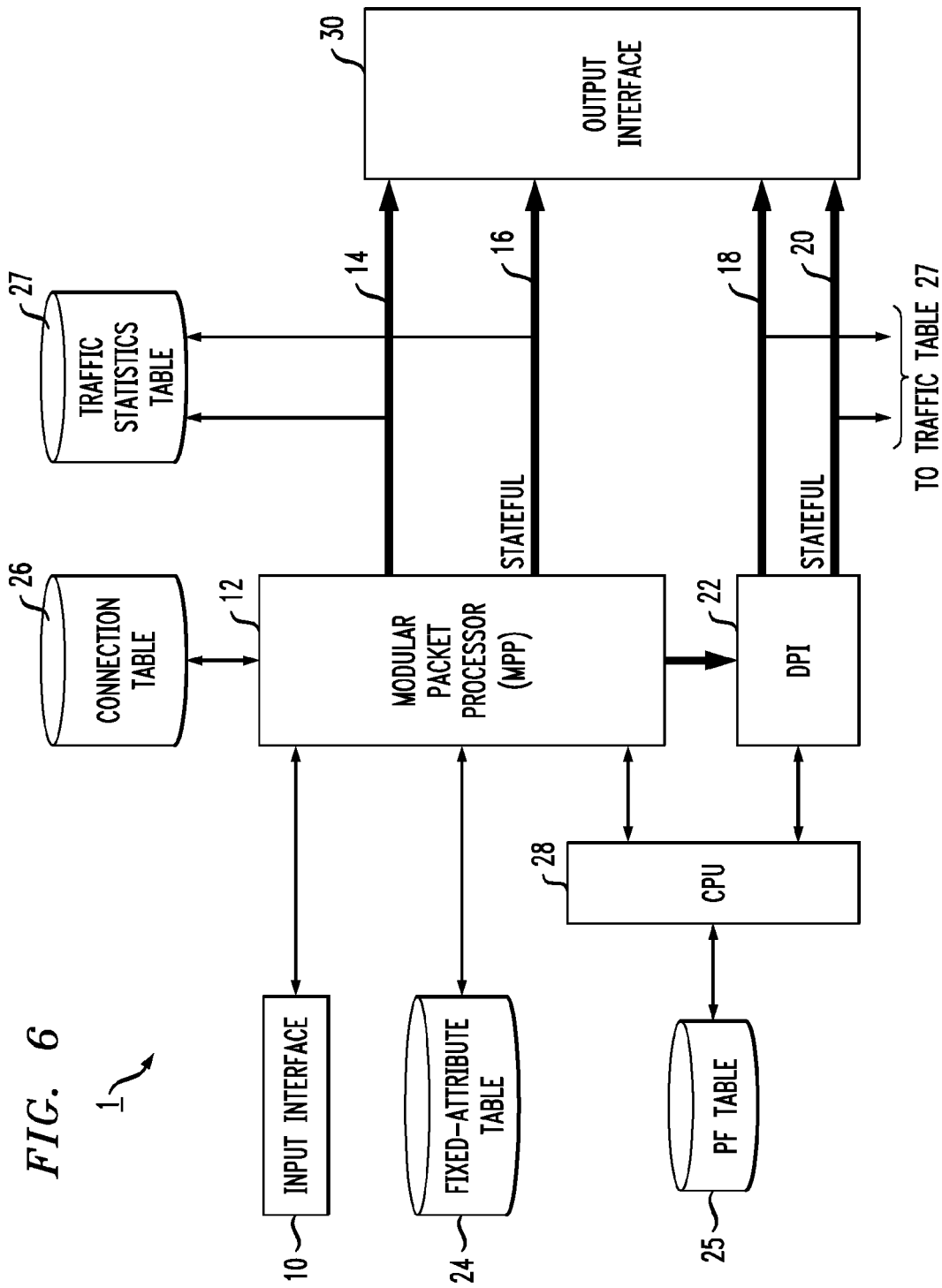
FIG. 6 shows an exemplary block diagram of an application recognition module in accordance with exemplary embodiments of the present invention.

FIG. 6 is a diagram of an exemplary application recognition module 1, illustrating the utilization of a set of four virtual pipelines for efficient application recognition in accordance with the present invention. An incoming packet is accepted via an input interface 10 (e.g., an Ethernet input/output adapter (EIOA) module) and is immediately passed into a modular packet processor (MPP) 12. Subsequent to passing through the elements forming application recognition module 1, the original (i.e., unmodified) incoming packet thereafter passes through an output interface 30 toward its ultimate destination (not shown). MPP 12 may be configured as a special-purpose processor or a suitably programmed general purpose processor, as needed.

In accordance with the present invention, MPP 12 is the initial "intelligence" described above that analyzes the header portion of a packet and thereafter directs the packet along the proper virtual pipeline for application recognition. There are three different methods used in this invention to perform application recognition, defined as follows: (1) Fixed attribute table (FAT)-based method; (2) DP1-based method; and (3) CPU-based method (for stateful processing). FAT-based is used for the majority of the various packets which are directed into MPP 12, where the destination port number and protocol are used as a query to a fixed-attribute table to define the application. For example, the telnet traffic destination port number (as carried in the packet header), is "43". Therefore, if the value "43" is found in the destination port portion of an incoming packet header, a query to the fixed-attribute table will return "telnet" as the application type.

The DPI-based method is needed to identify a relatively small number of applications based on information within the payload of the packet, and the CPU-based method analyzes the dynamic port identification, in combination with other stored information, to identify the associated application.

In the exemplary embodiment as shown in FIG. 6, there are four different virtual pipelines for handling application recognition in the incoming traffic. A first virtual pipeline 14 is appropriate for handling most of the incoming packets, using only the FAT-based application recognition method. Applications running on standard (static) port assignments are detected using this fixed-attribute method, based on (for example) the destination port and protocol information within the header portion of the packet. A fixed-attribute table 24 is maintained in application recognition module 1 and is queried by MPP 12 to assist in identifying the application associated with the specified destination port and protocol (such as the "telnet" and "port 43" correspondence mentioned above).

A second virtual pipeline 16 is utilized to perform application recognition for a select type of incoming packets associated with "stateful processing". The procedure along this pipeline also begins by sending queries to FAT 24, but then involves further processing within a CPU 28 (for example, in those cases where matching to a static port address in FAT 24 fails), in this case. CPU 28 parses the packet to extract dynamic destination port information, which is thereafter used with a predicted flow (PF) table 25 to determine the proper application. In particular, PF table 25 stores dynamic port number assignments that are negotiated during the establishment of a communication path (i.e., a connection) between a source and a destination involved in a stateful process.

The remaining two virtual pipelines, designated as 18 and 20 in FIG. 6, both require DPI analysis to provide application recognition. Incoming packets directed along these virtual pipelines are first passed from MPP 12 to DPI processor 22. For packets directed along virtual pipeline 18, the DPI process is sufficient to provide application recognition. DPI utilizes signature-based application recognition, searching into the payload of the packet to attempt to match signatures and patterns unique to the various application types. Only those packets directed into virtual pipeline 20 by MPP 12 require extensive processing (for stateful processes) and need to access CPU 28, after passing through DPI processor 22, to extract the dynamic port information and process it in the manner described above to determine the appropriate associated application.

With reference to FIG. 6, the following describes the four differential virtual pipelines into which MPP 12 will direct incoming packets so as to most efficiently perform application recognition. It is to be understood that additional virtual pipelines (or fewer) may be utilized in situations where the types of applications are more or less complicated.

First Virtual Pipeline 14: Fixed-Attribute Table (FAT) Lookup

Application recognition for a packet directed into first pipeline 14 by MPP 12 is obtained by performing a lookup in FAT 24 based on information within the header of the packet. The lookup, performed using the destination port identity and protocol information, returns the identity of the associated application. This information is then stored in a connection table 26. In particular, the packet is mapped to an entry in connection table 26, based on (for example) a 5-tuple lookup of the following information: (1) source IP address, (2) destination IP address; (3) source port; (4) destination port; and (5) protocol (the actual number of information items in the "tuple" lookup will vary as different application recognition requirements vary). At this point, the packet either maps to an existing connection in table 26 ("fast path"), or a new entry is created in table 26 in the event no entry is found for the presented 5-tuple (e.g., the packet is the 'first' packet received for a new connection). Connection table 26 also stores the application ID, byte count and packet count for the new stream ("slow path"). The statistical information created during this application recognition process is thereafter stored in a traffic profiling table 27. Subsequent to the recognition process, the stream is sent out to an output interface 30 (which may comprise, for example an Ethernet input/output adapter (EIOA)).

Second Virtual Pipeline 16: Stateful Processing

This virtual pipeline is used when the packet header information scanned by MPP 12 suggests that stateful processing is required, but there is no need for DPI processing. In most cases of stateful processing, the destination (dynamic) port information is assigned when an initial request for a connection (i.e., "session") between a source port and a destination port s received, where this destination port information is then transmitted back to the source port, which results in maintaining a data connection between these two ports for the entire session. This dynamically associated port information is held in CPU 28 for the duration of the session between the source and destination. In order to prevent the actual transmission of the packet from being slowed, a copy of the packet can be created and sent to CPU 28 for further processing, while the original packet continues on toward output interface 30. Once CPU 28 has obtained the dynamic port information, it uses this to access predicted flow table 25 to obtain the associated application identity. As above, the application information is stored in traffic profiling table 27.

Third Virtual Pipeline 18: DPI Required

If MPP 12 determines that the incoming packet requires DPI analysis for application recognition, this processing is performed apart from the processing described above. In this case, MPP 12 creates a "matching" request and sends the request to DPI processor 22 to look for a particular signature or pattern within the payload portion of the packet. MPP 12 then waits for DPI processor 22 to scan through the payload of the packet, looking for a "match". If there is a match, then the DPI response to MPP 12 contains the signature that properly maps the incoming stream to the associated application. Traffic profiting table 27 is then updated with the recognized application information.

Fourth Virtual Pipeline 20: DPI and Stateful Processing

During the DPI scan described above with third virtual pipeline 18, it is possible that the DPI response suggests stateful processing is required. Alternatively, the original MPP 12 analysis may advise that both DPI and stateful processing are required to properly perform application recognition on this particular packet. In either case, the search through DPI processor 22 is first performed, with a copy of the received packet made and sent to CPU 28 for further processing to obtain the associated dynamic destination port information. The dynamic destination port information is then used to access predicted flow table 25 to obtain the proper application identification. As with the other data flows, the application recognition statistical information is stored in traffic profiling table 27 and the original packet is transmitted along fourth virtual pipeline 20 to output interface 30.

Figure 7:
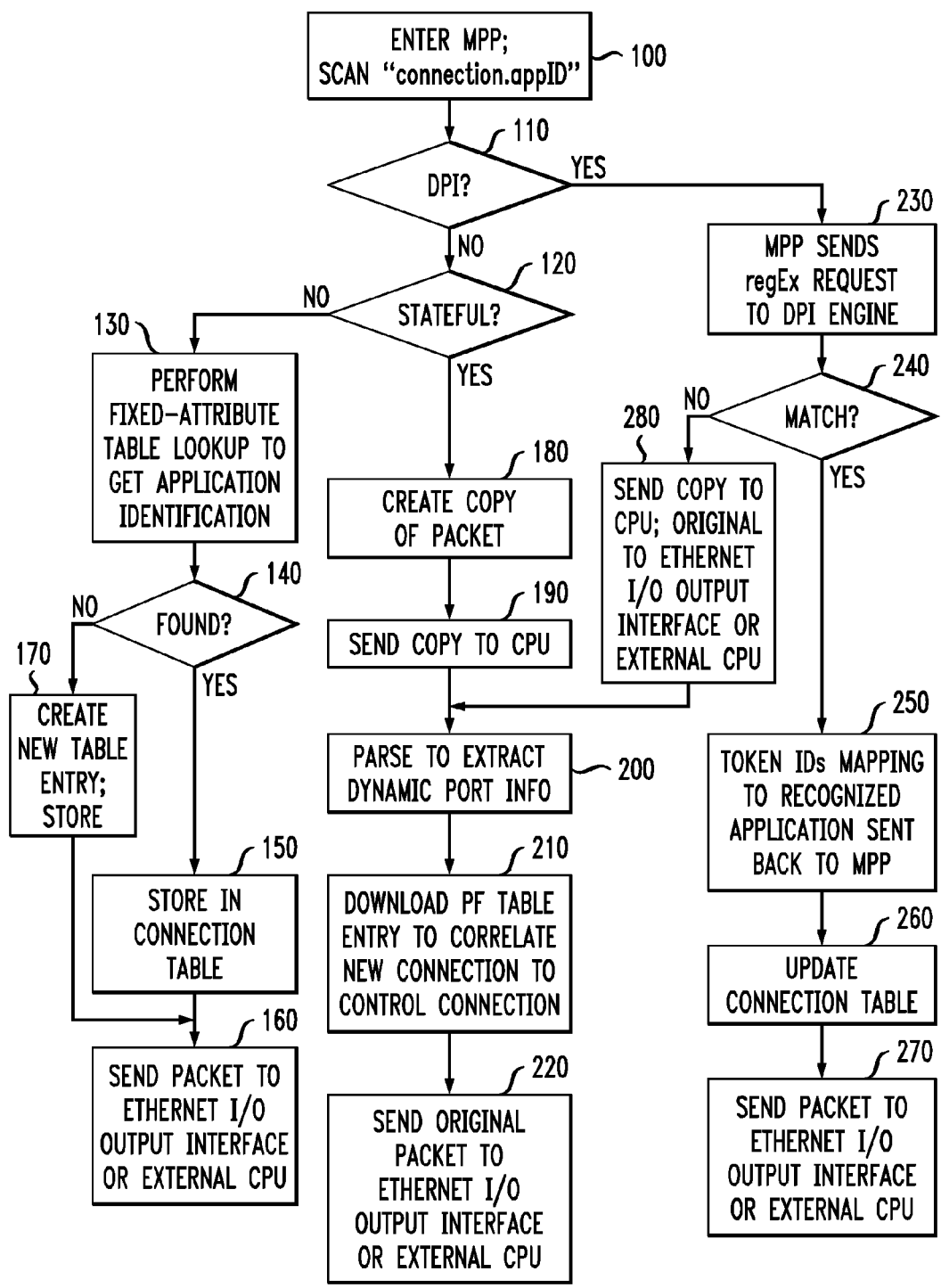
FIG. 7 is a flowchart illustrating an exemplary process flow for providing application recognition in accordance with embodiments of the present invention.

FIG. 7 contains a flowchart illustrating an exemplary packet flow in accordance with the application recognition process of the present invention. As shown, the process begins with the presentation of an incoming packet to MPP 12 (step 100). At this point, the header information portion of the packet is used to determine the proper path that will most efficiently provide proper application recognition.

Referring to FIG. 7, a determination is made if deep packet inspection (DPI) is required based on the packet header information (step 110). If DPI is not required, a follow-up determination is made with respect to the need for stateful processing (step 120). If this type of processing is not required, then a lookup of the packet's destination port and protocol is performed in the fixed-attribute table (FAT), at step 130. If the connection information is found (a positive response to the "found?" query at step 140), it is used as an entry in the connection table (140). In this case, the packet maps to an existing connection and the table is updated to reflect the addition of this packet. The packet is then sent to the output interface (step 160). Returning to the query point at step 140, if the lookup in connection table fails to find an entry, a new connection entry is made at step 170 (the "slow path"), with all of the information regarding the application type, the source port, destination port, source IP address and destination IP address. The packet is also sent to the output interface.

Returning to the decision point at step 120, if it is determined that stateful processing is necessary (without the need for DPI for this packet), then a copy of the packet is created at step 180 and sent to the CPU at step 190. The copy of the packet is then parsed in the CPU to extract the dynamic destination port information (step 200), and this dynamic port information is downloaded into the predicted flow table (step 210) to correlate this dynamic port to a new connection. The original packet is forwarded to the output interface (step 220).

Returning to the decision point at step 110, if it determined that DPI is required, the MPP will send a "matching" request to the DPI processor (step 230), requesting that the payload be scanned to search for a signature. If there is a match (step 240), the signature that maps to the identified application is sent back to the MPP (step 250), which then updates the connection table (step 260), and sends the packet to the output interface (step 270). If there is no match at step 240, a copy of the incoming packet is then sent to the CPU (step 290), and the flow as outlined starting at step 200 is followed.

While the exemplary embodiments of the present invention have been described with respect to processing blocks in a software program, including possible implementation as a digital signal processor, micro-controller, or general-purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or, transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be exemplary. Likewise, additional steps might be included in such methods, and certain steps may be omitted or combined, in methods consistent with various embodiments of the present invention.

It will be further understood that various changes in the details, materials, and arrangements of the parts which have been described and illustrated in order to explain the nature of this invention might be made by those skilled in the art without departing from the scope of the invention as expressed in the following claims.

What is claimed:

1. A system for providing application recognition with respect to incoming packet-based data traffic, the system comprising:

one or more processors; and one or more memory devices having stored therein a plurality of instructions that, when executed by the one or more processors, cause the system to:
  analyze a portion of an incoming packet and route the incoming packet to a selected one of a plurality of separate application recognition tasks for performing application recognition based upon the analyzed portion, wherein each application recognition task utilizes a different process to perform application recognition;
  wherein the plurality of separate data paths application recognition tasks comprises a set of four virtual pipelines, with a first virtual pipeline utilizing fixed-attribute table lookup to provide application recognition for a first type of data traffic, a second virtual pipeline utilizing stateful processing in a processor of the one or more processors to provide application recognition for a second type of data traffic, a third virtual pipeline utilizing deep packet inspection to provide application recognition for a third type of data traffic, and a fourth virtual pipeline utilizing both deep packet inspection and stateful processing in a processor of the one or more processors to provide application recognition for a fourth type of data traffic.

2. The system of claim 1 wherein at least one application recognition task of the plurality of separate application recognition tasks utilizes deep packet inspection to perform application recognition.

3. The system of claim 1 wherein at least one application recognition task of the plurality of application recognition tasks utilizes a fixed-attribute table to perform application recognition.

4. The system of claim 1 wherein at least one application recognition task of the plurality of application recognition tasks provides stateful processing using a central processing unit to extract dynamic port information and provide predicted flow information for application recognition.

5. The system of claim 1 wherein the incoming packet includes header information and the modular packet processor analyzes the header information to select the application recognition task for application recognition.

6. A communication system for performing application recognition on an incoming packet of data traffic, the communication system comprising;
  a modular packet processor for receiving the incoming packets of data traffic, analyzing a portion of an incoming packet, and routing, based upon the analyzed portion, to a selected one of a plurality of separate application recognition tasks for performing application recognition, wherein each application recognition task utilizes a different process to perform application recognition;
  a memory coupled to the modular packet processor and including a fixed attribute table for storage of a plurality of application identification and their associated source internet protocol addresses, destination internet protocol addresses, source ports, destination ports and protocols;
  a central processing unit coupled to the modulator packet processor for performing stateful processing based upon dynamically exchanged port information to determine application recognition; and
  a deep packet inspection processor coupled to the modular packet processor for searching a packet payload for signature information used to provide application recognition.

7. A communication system of claim 6, wherein the memory further includes:
  a connection table for storage of an association between a recognized application and an incoming packet; and
  a predicted flow table for storage of dynamic port information used in application recognition of stateful processing.

8. A method of performing application recognition on incoming data traffic comprising the steps of:
  submitting incoming data traffic to a modular packet processor;
  retrieving, in the modular packet processor, a portion of the header information from a packet of the incoming data traffic;
  determining whether stateful processing is required to perform application recognition and, if so:
    creating a copy of the incoming data traffic;
    sending the copy to a central processing unit for parsing to extract dynamic port information;
    downloading the dynamic port information to a connection table; and
    sending the original data traffic to an output interface; and
  determining, in the modular packet processor and based on the retrieved information, a proper application recognition task from a plurality of application recognition task to perform application recognition of the incoming data traffic, each application recognition task utilizing a different process to perform application recognition.

9. The method of claim 8, where the determining step includes a step of determining if deep packet inspection is required to perform application recognition.

10. The method of claim 8, where the determining step includes accessing a fixed attribute table to perform application recognition.

11. The method of claim 10, using destination and protocol information to retrieve a proper application recognition task for application recognition from the fixed-attribute table.

12. The method of claim 8 wherein the method is implemented by a machine executing program code encoded on a non-transitory machine-readable storage medium.

13. The method of claim 8 wherein the method further comprises the step of storing the recognized application with an identification of the associated incoming data traffic in a connection table.

14. The method of claim 8 wherein the method further comprises the step of utilizing the modular packet processor to route the incoming data traffic to the proper application recognition task required to perform application recognition.

* * * * *